United States Patent

[11] 3,607,216

| [72] | Inventor | Antonie C. van Elst<br>Velp, Netherlands |
|---|---|---|
| [21] | Appl. No. | 773,323 |
| [22] | Filed | Nov. 4, 1968 |
| [45] | Patented | Sept. 21, 1971 |
| [73] | Assignee | N. V. Billiton Maatschappy<br>The Hague, Netherlands |
| [32] | Priority | Nov. 3, 1967 |
| [33] | | Netherlands |
| [31] | | 6714949 |

[54] PROCESS FOR THE RECOVERY OF TIN FROM TIN ORES AND OTHER TIN-BEARING MATERIALS
11 Claims, No Drawings

[52] U.S. Cl. .................................................. 75/1,
23/136, 75/6
[51] Int. Cl. .................................................. C21b 1/00
[50] Field of Search .......................................... 75/85, 64,
98, 1, 6; 23/53, 98–99, 136, 144; 148/6.15, 6.17

[56] References Cited
UNITED STATES PATENTS

| 1,737,888 | 12/1929 | McIntosh | 75/85 X |
| 1,806,310 | 5/1931 | Robinson | 75/85 |
| 1,910,286 | 5/1933 | Freise | 75/85 |

*Primary Examiner*—Winston A. Douglas
*Assistant Examiner*—A. Skapars
*Attorneys*—James M. Heilman and Heilman and Heilman ABSTRACT: This invention relates to a process for the recovery of tin from tin ores and other tin-bearing materials by volatilization of the tin constituents in the form of tin sulfide, and possible further processing of the tin-containing flue dust on metal, alloys or compounds, comprising carrying out the volatilization with a starting material to which an amount of phosphorus-containing material has been added in such a proportion that there is at least 0.1 gram-atom P per gram-atom Fe present in the starting mixture.

PROCESS FOR THE RECOVERY OF TIN FROM TIN ORES AND OTHER TIN-BEARING MATERIALS

The present invention relates to a process for the recovery of tin from tin ores and other tin-bearing materials, such as tin ore concentrates, tin-bearing slags, ferrotin, "tin-stone," tin scrap and similar materials, which ores or other materials, in addition to the tin constituents usually also contain a considerable amount of iron constituents, by means of the volatilization of the tin constituents in the form of tin sulfide. In particular, the invention relates to such a process for the recovery of tin from sulfur and iron-containing tin ores with an iron content of at least 5%.

Processing tin ores and other tin-bearing flue dust by means of the volatilization of the tin in the form of tin sulfide is in itself a process which has been known for a long time, for which as the years went by, a number of proposals has been made. In this process, use is made of the volatility of SnS at higher temperatures (boiling point 1,230° C.) by heating sulfur-containing tin ores, or other tin ores or tin-bearing materials with an addition of a sulfur-containing material, in a furnace at a sufficiently high temperature, and by separating the flue dust escaping. In this process, there is often also an addition of carbonaceous material in order to reduce all the tin present to the bivalent form.

However, as a drawback of these known processes it has been found that when there is a proportionally high content of iron constituents present in the tin ores or other tin-bearing materials to be used as starting material, the volatilization of the tin in the form of tin sulfide is hampered, so that an iron-containing residue with a considerable content of tin constituents is left. The low yield which is obtained in this way in the tin sulfide-volatilization forms a serious obstacle to large-scale application, in particular for processing iron-containing tin ores with a relatively low tin content (25% or less).

A process is known which overcomes this drawback, by carrying out the volatilization of low-grade tin slags by adding sulfur-containing material and by passing through air and perhaps oil vapor, whereby the iron constituents are oxidized to iron oxide, while the tin volatilizes as tin sulfide. However, this process requires the consumption of considerably more than stoichiometrical amounts of sulfur-containing material, as well as the application of particular techniques and control apparatus for the lengthy passing through of gas mixtures which must react with the furnace charge, making this process also difficult for large-scale application.

The invention now aims at providing a process for the recovery of tin from tin ores and other tin-bearing materials, which ores or other materials, in addition to the tin constituents usually also contain a considerable amount of iron constituents, by which the drawbacks of the processes already known for processing tin ores and similar substances by the volatilization of the tin constituents in the form of tin sulfide outlined, are to a considerable extent eliminated.

According to the invention, the process for the recovery of tin from tin ores and other tin-bearing materials, which ores or other materials in addition to the tin constituents also contain a considerable amount of iron constituents, by means of the volatilization of the tin constituents in the form of tin sulfide from the starting material, to which, if necessary, may also have been added an amount of a sulfur-containing material and/or an amount of carbonaceous material, and possible further processing of the tin-containing flue dust on metal, alloys or compounds, is characterized by the fact that an amount of a phosphorus-containing material is added to the starting material in such a proportion that there is at least 0.1 gram-atom P per gram-atom Fe present in the starting mixture.

The phosphorus-containing material to be used according to the invention may, in principle, be any material solid at room temperature in which phosphorus occurs chemically bound, either in the form of a single compound or in the form of a mixture or complex compound. Alkali-, alkaline earth- or metallic phosphates, alkali-, alkaline earth- or metallic phosphites and metallic phosphides e.g., as well as materials which contain the said compounds are suitable. In general, the use of elementary phosphorus, although coming within the scope of the invention, has appeared to be less advisable, on account of its great volatility at the temperatures required for a good volatilization of the tin sulfide.

Use is preferably made of raw alkaline earth phosphates, as the phosphorus-containing material, in particular of tricalcium phosphate which is won on a large scale in the form of the minerals apatite or phosphorite. It has appeared that excellent results are obtained in particular, if the starting mixture, to which phosphates are added as phosphorus-containing material, also contains an addition of carbonaceous material, e.g. coke or coal.

It is a surprising fact that according to the invention it is possible to volatilize the tin in the form of tin sulfide in high yields from tin ores and other tin-bearing materials of varying natures, which starting materials contain tin and iron constituents in an unfavorable proportion, such as e.g. tin ore concentrates with a tin content and an iron content both varying between 5% and 25%, for which purpose it is only necessary to add an amount of easily obtainable and cheap phosphorus-containing material, such as raw phosphate. In this process, which does not require the application of particular techniques and which can be carried out in equipment usual for metallurgical processes, in principle, only the amount of sulfur constituents needed for the stoichiometrical formation of SnS need be present in the starting mixture. For this reason, the process is of particular advantage for the recovery of tin from sulfur and iron-containing tin ores, in which, in general, the amount of sulfur needed for the complete volatilization of the tin in the form of SnS is abundant, or can be obtained by mixing ores of varying compositions. In those cases where the process is applied to tin ores or other tin-bearing materials which contain no or not sufficient sulfur the required amount of this may be added in the form of sulfur-containing material of a varying nature, e.g. pyrite or gypsum.

According to the invention, the phosphorus-containing material is added in such an amount that there is at least 0.1 gram-atom P per gram atom Fe in the mixture. However, the phosphorus-containing material is preferably added in larger amounts, and in such a way that the atomic ratio between P and Fe in the starting mixture amounts to from 0.3–0.6:1. Naturally, larger amounts of phosphorus-containing material may also be used, but it has appeared that, in general, no better results are obtained with these than with the amounts within the aforesaid limits.

The process is carried out by heating a mixture of the said materials in any suitable equipment, e.g. in a reverberating furnace, a rotary kiln, a shaft furnace, an electric furnace and such, to a sufficiently high temperature to effect the volatilization of the tin sulfide. The temperature range within which the volatilization is preferably effected, lies between 1,250° and 1,500° C., but it is also possible to use lower temperatures, e.g. from 1,100° to 1,250° C., or temperatures above 1,500° C.

If so desired, in addition to the constituents already mentioned, it is possible to add other materials to the starting mixture, serving e.g. to keep the slag formed sufficiently fluid. Among other substances, mention may be made of lime stone, sand or certain silicates as such additions.

The further processing of the tin-bearing flue dust into tin, tin alloys or other tin compounds may then take place according to well-known methods.

The invention is further explained by means of the following examples. In these examples "parts" is always taken to mean "parts by weight" and "percent by weight."

EXAMPLE 1

A mixture consisting of 500 parts of ground tin ore concentrate (containing 18.5% Sn, 18% Fe and 12% S), 75 parts of ground anthracite and 100 parts of raw calcium phosphate (containing 75 % $Ca_3(PO_4)_2$) is heated in a crucible furnace at an average temperature of 1,375° C. for 2 hours. When the mixture has cooled, it appears that an amount of 390 parts of slag with a Sn content of 1.1% and 91 parts of iron residue with a Sn content of 7.5% is left behind in the furnace. Therefore, the yield of the tin volatilization amounts to 88.0%.

For the purpose of a comparison, a corresponding test is carried out with a mixture consisting of 500 parts of the same tin ore concentrate, 30 parts of ground anthracite and 200 parts of lime stone. In doing so, it appears that when the mixture has cooled, an amount of 340 parts of slag with a Sn content of 2.65% and 150 parts of iron residue with a Sn content of 24.0% is left. Therefore, in this case the yield of the tin volatilization only amounts to 51.3%.

EXAMPLE 2

In the same way as described in Example 1, a mixture consisting of 500 parts of the same ore concentrate, 75 parts of ground anthracite and 200 parts of the same raw calcium phosphate is heated for 2 hours at an average temperature of 1,400° C. When the mixture has cooled, an amount of 385 parts of slag with a Sn content of 0.47% and 105 parts of iron residue with a Sn content of 0.45% is left behind in the furnace. Therefore, the tin has been volatilized with a yield of 97.5%.

In a corresponding test, in which a mixture of 500 parts of tin ore concentrate, 150 parts of anthracite and 250 parts of raw phosphate is heated at the same temperature it appears that an amount of 390 parts of slag with a Sn content of 0.56% and 25 parts of iron residue with a Sn content of 0.2% is left, so that in this case the yield of the tin volatilization amounts to 97.6%.

EXAMPLE 3

A mixture consisting of 500 parts of another tin ore concentrate (containing 10.3% Sn, 17.1% Fe and 7.5% S), 150 phosphate of anthracite and 200 parts of the same raw calcium phosphate is heated at an average temperature of 1,450° C. for 2 hours in the same way as described in the previous examples. When the mixture has cooled, an amount of 350 parts of slag with a Sn content of 0.1% and 87 parts of iron residue with a Sn content of less than 0.1% is left, so that in this case the yield of the tin volatilization amounts to 99.2-99.3%.

EXAMPLE 4

An amount of 500 parts of the same tin ore concentrate as used in Examples 1 and 2 is mixed with 100 parts of anthracite, 150 parts of raw phosphate and 25 parts of sand, after which the mixture is heated in similar fashion in a crucible furnace at a temperature of 1,450° C. for 75 minutes. When the mixture has cooled, an amount of slag is found consisting of 325 parts with a Sn content of 0.4% and an amount of iron residue of 110 parts with a Sn content of 3.5%. Therefore, the yield of the tin volatilization amounts to 94.4%.

EXAMPLE 5

A mixture consisting of 500 parts of the same ore concentrate as used in the previous example, 100 parts of lime stone and 100 parts of di-iron phosphide is heated in the same fashion at an average temperature of 1,430° C. for 90 minutes. When the mixture has cooled, an amount of 380 parts of slag with a Sn content of 3.0% and an amount of 220 parts of iron residue with a Sn content of 2.7% are left behind, so that the yield of the tin volatilization amounts to 81.5%.

EXAMPLE 6

A mixture consisting of 10,000 parts of the tin ore concentrate from Example 1, 1,000 parts of anthracite and 3,000 parts of raw phosphate is heated in a furnace at an average temperature of 1,420° C. for three hours. When the mixture has cooled, an amount of 6,300 parts of slag is found in the furnace with a Sn content of 0.13% and an amount of 2,400 parts of iron residue with a Sn content of 0.75%, so that the yield of the tin volatilization amounts to 98.6%.

The embodiments of the invention in which an exclusive property or privilege is claimed are defined as follows:

1. A process for the recovery of tin from a starting material composed of tin ore materials and other tin bearing materials which materials in addition to the tin constituents also contain a considerable amount of iron and sulfur characterized by adding an amount of a phosphorus-containing material to the starting material in such a proportion that there is at least 0.1 gram-atom P per gram-atom Fe present in the starting mixture, and subsequently heating to cause volatilization of the tin constituents in the form of tin sulfide from the starting material.

2. A process as set forth in claim 1 characterized by adding a sulfur-containing material and a carbonaceous material to the starting material.

3. A process according to claim 1 characterized by the fact that the phosphorus-containing material is added in such a proportion that there is 0.3-0.6 gram-atom P per gram-atom Fe present in the starting mixture.

4. A process according to claim 3 characterized by the fact that a material containing alkaline earth phosphate is used as the phosphorus-containing material.

5. A process according to claim 4 characterized by the fact that raw tricalcium phosphate is used as the phosphorus-containing material.

6. A process according to claim 5 characterized by the fact that the starting mixture contains an amount of carbonaceous material.

7. A process according to claim 6 characterized by the fact that the starting mixture is heated at a temperature exceeding 1,100° C., preferably between 1,250° and 1,500° C.

8. A process according to claim 7 characterized by the fact that a tin ore material containing sulfur and iron with an iron content of at least 5% is used as the starting material.

9. A process as set forth in claim 2 characterized by the fact that the starting mixture is heated at a temperature exceeding 1,100° C., preferably between 1,250° and 1,500° C. for 2 hours.

10. A process as set forth in claim 1 wherein the starting material consists of, all by weight, approximately 500 parts of ground tin ore concentrate containing approximately 18.5% Sn, 18% Fe, and 12% S, 75 parts of ground anthracite and 100 parts of raw calcium phosphate containing 75% $Ca_3(PO_4)_2$, and wherein said material is heated at approximately 1,375° C. for approximately 2 hours.

11. A process as set forth in claim 1 wherein the starting material consists of, all by weight, approximately 500 parts of ground tin ore concentrate containing approximately 18.5% Sn, 18% Fe, and 12% S, 75 parts of ground anthracite, and 200 parts of raw calcium phosphate containing 75% $Ca_3(PO_4)_2$, and wherein said material is heated at a temperature between 1,250° and 1,500° C. for approximately 2 hours.